Dec. 5, 1933.  E. RICARD ET AL  1,937,786
PROCESS FOR THE SIMULTANEOUS DISTILLATION, PURIFYING, AND
DEHYDRATION OF ALCOHOL OBTAINED FROM FERMENTED MASH
Filed April 9, 1931  2 Sheets-Sheet 1
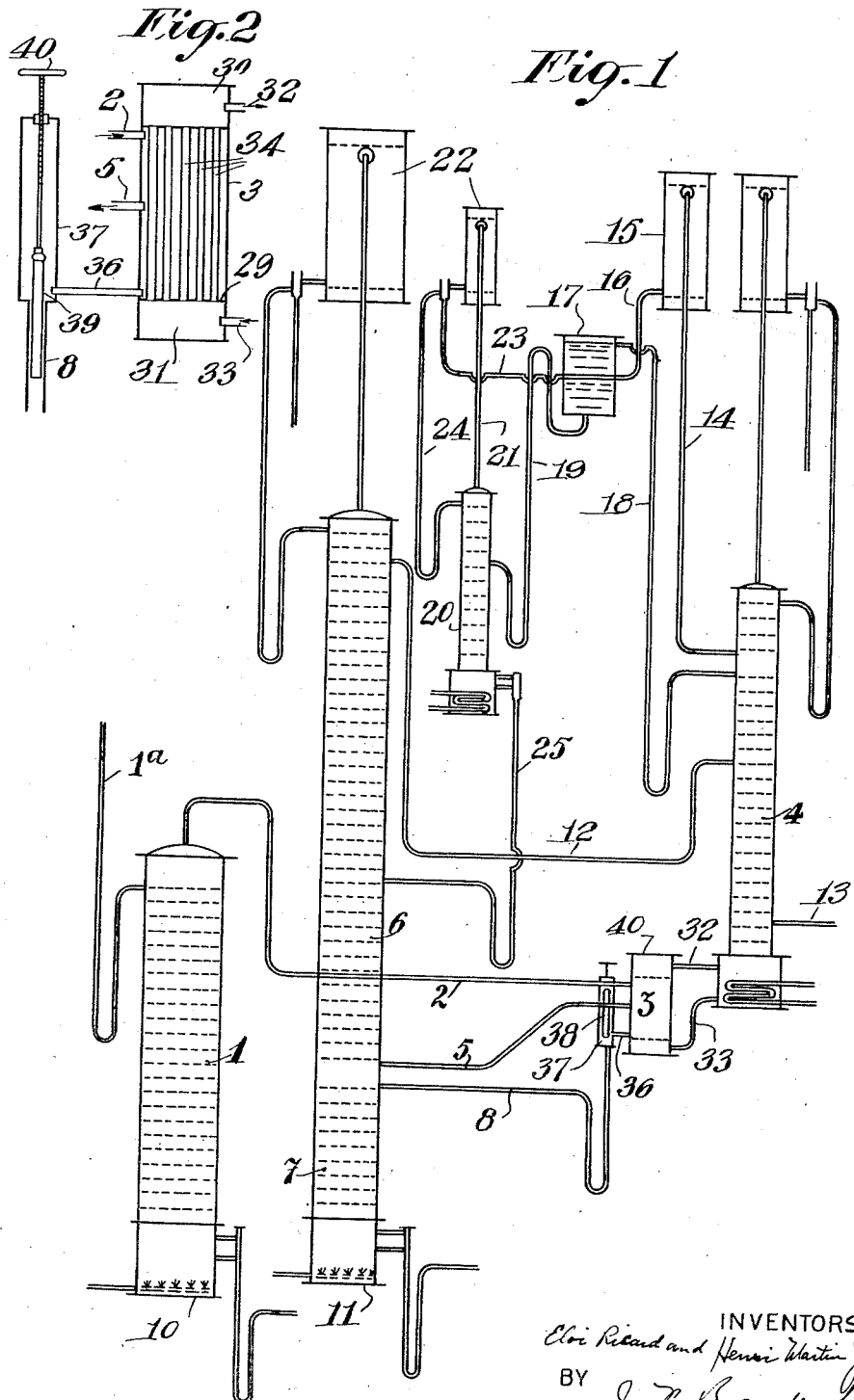
INVENTORS
Eloi Ricard and Henri Martin Juniot
BY J. P. Brandenburg
ATTORNEY

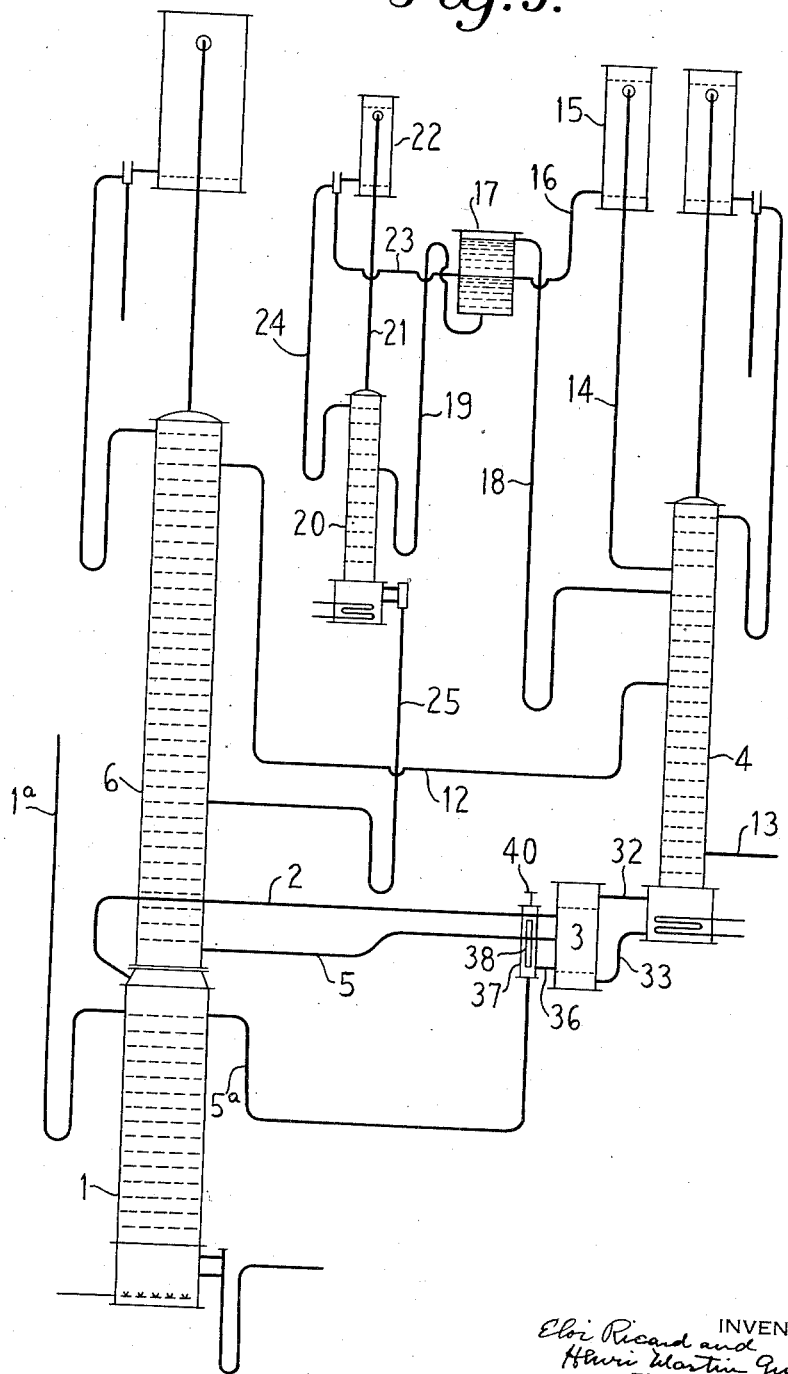

Patented Dec. 5, 1933

1,937,786

UNITED STATES PATENT OFFICE 1,937,786

PROCESS FOR THE SIMULTANEOUS DISTILLATION, PURIFYING, AND DEHYDRATION OF ALCOHOL OBTAINED FROM FERMENTED MASH

Eloi Ricard and Henri Martin Guinot, Melle, France, assignors to U. S. Industrial Alcohol Co., New York, N. Y., a corporation of West Virginia Application April 9, 1931, Serial No. 528,786, and in France April 22, 1930

4 Claims. (Cl. 202—40)

It is known that a high degree column consists of the combination of two distinct elements; a mash exhausting column on the one hand, and an alcohol concentrating column on the other hand, each of these elements playing a well determined part. These two columns may be either disposed one directly over the other, or juxtaposed.

The temperature at the upper part of the concentrating column is 78.5 degrees C., and at the upper part of the exhausting column from 90 to 99° C., according to the percentage and initial temperature of the feed mash.

In our Patent No. 1,822,454, dated September 8, 1931, we disclosed a method of utilizing the latent heat of the alcoholic vapors at a high degree issuing from the upper part of the concentrating column for heating the dehydrating column either partially or entirely.

Our present invention has for its object a modification of that process which consists in utilizing the heat available at the top of the exhausting column for the heating of the dehydrating column and, if need be, of the purifying auxiliary small columns and other parts of the apparatus, and that as well in the case of the exhausting column being separate from the concentrating column as in the one of the exhausting column being disposed under the concentrating column so as to form a single column therewith. This modification is particularly advantageous when treating mashes that contain but a low percentage of alcohol, such as those obtained in the manufacture of yeast or sulphite alcohol.

The heat that is necessary for treating such mashes is greater than the heat that is necessary for concentrating the alcohol, and therefore it is of advantage to use the method according to the present invention, for the vapors that issue at the top of the exhausting column are at a temperature of about 95° C. and circumstances are very favorable for the surface heating of the dehydrating column at the lower part of which the temperature is about 80° C.

Under the circumstances, it is less necessary or desirable to artificially increase the difference of temperature through a difference of pressure between the two columns as disclosed in our Patent No. 1,822,454 our prior applications Serial No. 350,809, filed March 28, 1929 and Ser. No. 490,840, filed October 24, 1930.

The vapours that are condensed in the device for heating the dehydrating column are returned in the liquid state to the exhausting column.

When the exhausting column and the concentrating column are separate, the condensate may be returned either to the exhausting column itself or to the part of the concentrating column that serves to exhaust weak alcoholic liquids.

Likewise, the principle of our invention is not departed from whether the whole or a part of the vapours isssuing from the exhausting column is caused to flow through the device for heating the dehydrating column.

A preferred example of our invention, and a modification will be hereinafter described with reference to the appended drawings which show mash distilling plants according to our invention. In the first example the exhausting column and the concentrating column are separate.

In the said drawings:

Fig. 1 is a schematic view of a plant;

Fig. 2 is a somewhat more realistic view of a part; and

Fig. 3 is a schematic view of the modification.

The mash, heated through any suitable means, (wine heater or vinasses, or both means simultaneously) enters through 1ª the exhausting column 1. The vapours that issue from the upper part of this column are sent through pipe 2 into a heater and condenser 3 having a variable surface which serves to heat dehydrating column 4. The heater and condenser 3 comprises a nest of tubes to which the vapors are admitted and whose heating surface is increased or reduced by means of a hand-wheel which makes it possible to regulate at will the height of liquid condensed in the apparatus.

The uncondensed vapours are conveyed through pipe 5 to the usual concentrating column 6 comprising an exhausting portion 7.

The alcoholic liquid condensed in heating condenser 3 is returned through pipe 8 to the exhausting portion 7 in order to be exhausted in that part of column 6.

Fig. 2 illustrates in more detail a construction of the heater and condenser 3 and its auxiliary device. A shell 27 has septa 28, 29 forming chambers 30 and 31 at top and bottom connected in circuit with the base of the dehydrating column by pipes 32 and 33. These chambers are connected by the nest of tubes 34, through which passes the liquid of the column 4. Pipes 2 and 36 connect with the upper and lower portions of the space around the tubes 34. Pipe 36 is the exit for the liquid which results from condensation of vapors taken from apparatus 1, which vapors have thus been caused to give up both sensible and latent heat so as to heat the contents of dehydration column 4. Through pipe 36 this liquid enters an upright vessel 37 having a sight-glass 38. An adjustable overflow tube 39 operated by hand-wheel 40 provides a way of regulating the height of liquid in the vessel 37 and consequently the height of liquid or condensate around the tubes 34. In this way the heating surface of the tubes 34 can be increased or reduced.

Distillating column 6 as well as dehydrating column 4 may comprise all the necessary organs for simultaneously purifying the alcohol that is being treated.

The following is given in further description of an operation to which the invention is applicable:

The exhausting column 1 is heated by steam at 10. The fermented mash is supplied continuously through the pipe 1a. The concentrating column is heated by steam at 11.

Distillation in the columns 1 and 6 is conducted so as to produce a high-grade raw alcohol, preferably 90°–95.5° Gay Lussac, and this alcohol passes through the pipe 12 to the dehydrating column 4. Here the alcohol is subjected to azeotropic distillation in the presence of a suitable water-entrainer, such as benzol for example, with which this column is charged. The dehydrated or absolute alcohol is drawn off at the base of this column through a pipe 13.

Vapors issuing from the upper part of the dehydrating column pass through the pipe 14 to a condenser 15, from which the condensate flows through a pipe 16 to a decanting apparatus 17, where it separates into two layers. The layer rich in entrainer is continually returned through a pipe 18 to the dehydrating column, while the liquid composing the other layer flows through pipe 19 to a small column 20, where it is distilled to remove entraining liquid, the vapors of this liquid passing through a pipe 21 to a condenser 22, whence the condensate passes partly by pipe 23 to the decanting apparatus 17 and thence to the dehydrating column 4, and partly by pipe 24 back to the auxiliary column 20. The liquid discharged from the bottom of the small column 20, which comprises alcohol and water, is returned through pipe 25 to the concentrating column 6.

Fig. 3 shows the placing of the exhausting column 1 under the concentrating column 6. The vapors which escape from the exhausting column 1 are conducted, as in the other example, through the pipe 2 to the condensing and vaporizing heat-interchanger 3, which gives heat to the dehydrating column 4. The vapors that are not condensed in the heat-interchanger are conducted by the pipe 5 into the concentrating column 6, and the alcoholic liquid condensed in the heat-interchanger is returned to the exhausting column 1 by pipe 5a, there to be exhausted.

While we have disclosed what we deem to be a preferred example of our invention, it should be well understood that we do not wish to be limited thereto, as there might be changes made therein without departing from the principle of our invention as comprehended within the scope of the appended claims.

What we claim is:

1. A continuous process for the manufacture of absolute alcohol which comprises exhausting mashes in one zone, and after concentrating the vapours thus produced in another zone, dehydrating the alcohol in a third zone and heating the liquid in the dehydrating zone through alcoholic vapours issuing from the exhausting zone.

2. A continuous process for the manufacture of alcohol which comprises exhausting alcoholic mashes in one zone, concentrating the vapors mashes in one zone concentrating the vapours thus produced in another zone, dehydrating the alcohol in a third zone, causing alcoholic vapours issuing from the exhausting zone to heat the liquid in the dehydrating zone through interchange of heat, conducting the vapours remaining after that treatment into the concentrating zone and returning the condensed alcoholic liquid to the exhausting zone.

3. A plant for the manufacture of absolute alcohol, which comprises a mash exhausting column, a concentration column connected with the exhausting column so that the alcoholic vapors from the exhausting column are concentrated in the concentration column, a dehydrating column for the azeotropic dehydration of the alcohol, connected with the concentration colmn, a heat interchanger for heating of the dehydrating column, means connecting the lower portion of the dehydrating column with the heat exchanger, and return means connecting the heat exchanger with the bottom of the dehydrating column, means for feeding alcoholic vapors issuing at the top of the exhausting column to said heat interchanger, means for returning condensed and uncondensed vapors, respectively, from the heat interchanger to the mash exhausting column and to the concentration column, and means for supplying high-grade alcohol issuing from the top of the concentration column to the dehydrating column.

4. A plant according to claim 3 in which the concentrating column and the exhausting column are superposed, the lower portion of the concentrating column being adapted to act as an exhausting element.

ELOI RICARD.
HENRI MARTIN GUINOT.